United States Patent [19]
Clarke

[11] Patent Number: 5,233,843
[45] Date of Patent: Aug. 10, 1993

[54] ATMOSPHERIC MOISTURE COLLECTION DEVICE

[75] Inventor: Norman P. Clarke, Camarillo, Calif.

[73] Assignee: The United States of America as represented by the Secretary of the Navy, Washington, D.C.

[21] Appl. No.: 849,866

[22] Filed: Mar. 12, 1992

Related U.S. Application Data

[62] Division of Ser. No. 724,254, Jul. 1, 1991, abandoned.

[51] Int. Cl.$^5$ .............................................. F25D 23/00
[52] U.S. Cl. ................................ 62/271; 62/93; 95/209; 95/231
[58] Field of Search ............... 62/93, 94, 271, 272; 55/29, 31, 32, 208, 267

[56] References Cited

U.S. PATENT DOCUMENTS

| | | | |
|---|---|---|---|
| 1,918,682 | 7/1933 | Altenkirch | 62/94 |
| 2,462,952 | 3/1949 | Dunkak | 55/208 |
| 2,782,150 | 2/1957 | Stalcup | 202/185 |
| 3,226,948 | 1/1966 | Alderson et al. | 62/317 |
| 3,318,107 | 5/1967 | Riley et al. | 62/272 |
| 3,616,615 | 11/1971 | Woodbury | 62/272 |
| 3,675,442 | 7/1972 | Swanson | 62/272 |
| 3,834,126 | 9/1974 | DiMinno, Jr. | 55/210 |
| 4,148,617 | 4/1978 | Clark | 55/267 |
| 4,171,620 | 10/1979 | Turner | 62/94 |
| 4,197,713 | 4/1980 | Bulang | 55/208 |
| 4,242,112 | 12/1980 | Jebens | 55/208 |
| 4,313,312 | 2/1982 | Ito et al. | 62/271 |
| 4,315,599 | 2/1982 | Biancardi | 239/10 |
| 4,342,569 | 8/1982 | Hussman | 55/33 |
| 4,351,651 | 9/1982 | Courneya | 55/210 |
| 4,377,398 | 3/1983 | Bennett | 55/208 |
| 4,705,543 | 11/1987 | Kertzman | 55/158 |
| 4,707,995 | 11/1987 | Assaf | 62/94 |
| 4,841,740 | 6/1989 | Assaf | 62/271 |
| 4,869,070 | 9/1989 | Assaf | 62/94 |
| 5,020,333 | 6/1991 | Assaf et al. | 62/271 |

Primary Examiner—Albert J. Makay
Assistant Examiner—William C. Doerrler
Attorney, Agent, or Firm—Ron Billi; Melvin J. Sliwka

[57] ABSTRACT

An apparatus for extracting moisture from the ambient air includes a desiccant pond for absorbing moisture from the air to produce a water rich desiccant, means for vaporizing the moisture in the water rich desiccant, mixing the vaporized moisture with ambient air to increase the dew point of the ambient air, condensing the vaporized moisture to form a potable water condensate and returning the water lean desiccant back to the desiccant pond.

2 Claims, 2 Drawing Sheets

ATMOSPHERIC MOISTURE COLLECTION DEVICE

This is a divisional of co-pending application Ser. No. 07/724,254 filed on Jul. 1, 1991, now abandoned.

BACKGROUND OF THE INVENTION

This invention relates generally to an apparatus for extracting moisture from the ambient air. More particularly, this invention relates to an apparatus for collecting water vapor by the use of desiccants to obtain a moisture rich desiccant; heating the collected moisture rich desiccant by solar radiation means to form a highly concentrated water vapor/air mixture; and then transforming the concentrated water vapor to liquid by cooling and condensation.

There have been many systems for collecting moisture from ambient air. Some systems are simple and/or passive and others require complex mechanics such as heaters and blowers to operate. These systems are most efficient when the moisture content of the ambient air is high. U.S. Pat. No. 3,318,107 to J. E. Riley et al discloses a system that extracts water vapor from the ambient air without mechanical energy or fuel by maximizing various environmental factors that contribute to producing a condensate. U.S. Pat. No. 4,705,543 to Kertzman discloses a fluid drying tube that may employ a solid desiccant bed to enhance the removal of moisture from the tube. U.S. Pat. No. 4,351,651 to Courneya discloses an apparatus that includes a heat exchanger to cool ambient air to obtain a potable condensate.

Other Patents showing various devices and methods include U.S. Pat. No. 2,782,150; U.S. Pat. No. 3,226,948; U.S. Pat. No. 3,834,126; U.S. Pat. No. 4,315,599; U.S. Pat. No. 3,834,133 and U.S. Pat. No. 4,148,617. All the above patents are hereby incorporated by reference.

However, the above devices either do not produce a satisfactory quantity of condensate in climates where the moisture content in the atmosphere is low or they are complex, consume large amounts of fuel and/or are large, heavy and cumbersome.

Thus, there is a need in the art for an apparatus which efficiently, produces a potable water supply from ambient air even when the moisture content of the ambient air is low and that is simple and easy to operate. It is, therefore, the principle object of the present invention to provide an apparatus that will extract a potable water supply from the ambient air (atmosphere) even when the moisture content is low. It is another important object of the present invention to provide an apparatus that may extract potable water from the atmosphere that is simple, cost efficient and that does not require complex mechanical means and/or fuel fired heaters.

SUMMARY OF THE INVENTION

Accordingly, the preferred embodiment of the moisture collecting device of the present invention includes: a liquid desiccant pond that absorbs moisture from the atmosphere to form a water-rich desiccant; means for vaporizing the moisture in the water-rich desiccant; mixing the vaporized moisture with ambient air to increase the dew point of the ambient air; conveying said ambient air mixture to a cooling means for condensing the vaporized moisture to form a potable water condensate; and returning the water-lean desiccant back to the desiccant pond for reuse.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
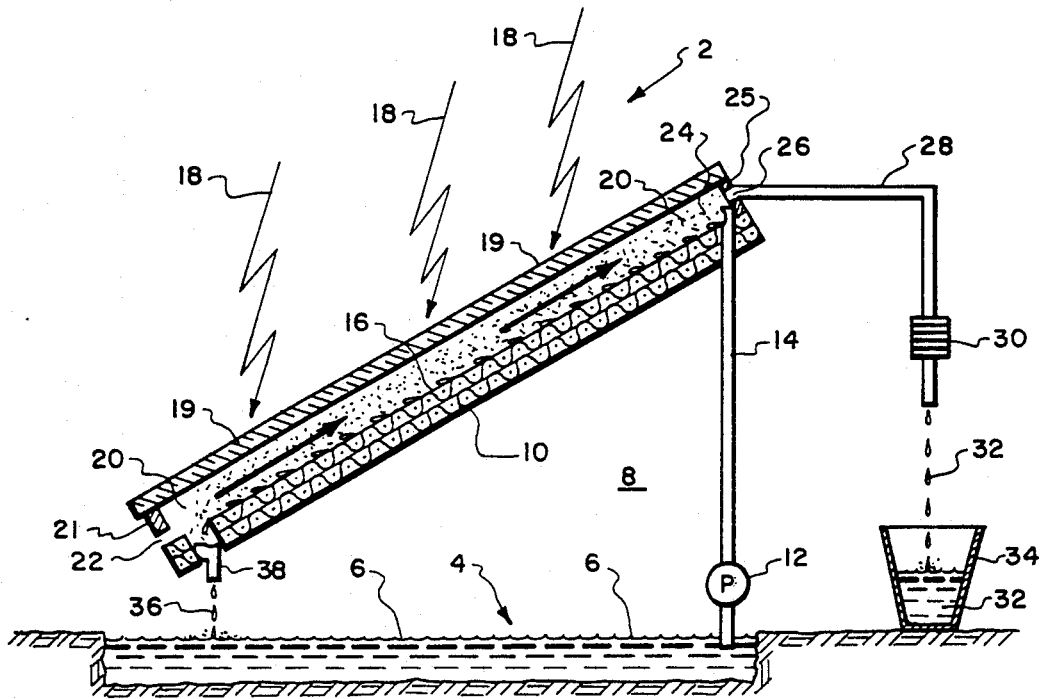
FIG. 1 is a cross-sectional view of the preferred embodiment of the present invention using a liquid desiccant to collect moisture.
Figure 2:
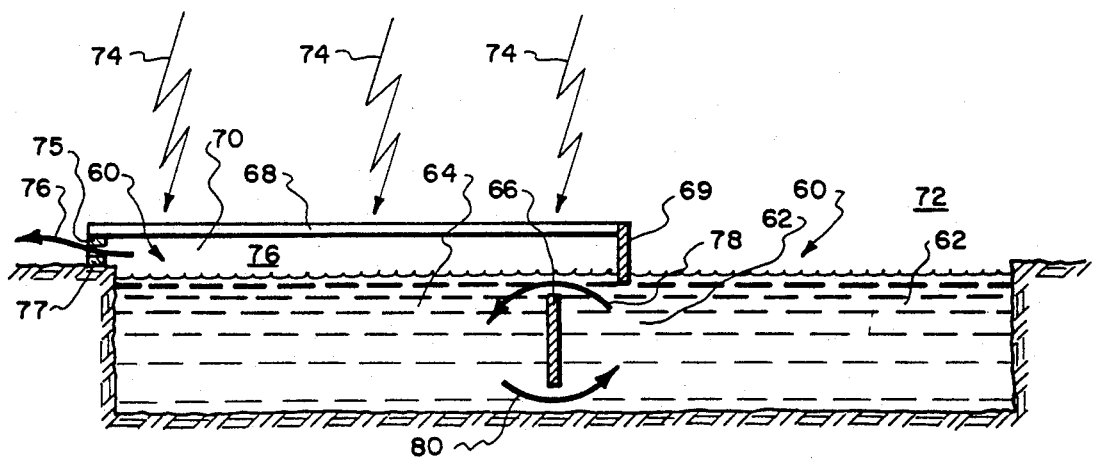
FIG. 2 is a cross-sectional view of a completely passive embodiment of the present invention using a liquid desiccant to collect moisture.

The moisture collection device 2 of the present invention is illustrated by way of example in FIGS. 1 and 2. As shown in FIG. 1, desiccant pond 4 includes a mixture 6 of desiccant and moisture, the moisture being absorbed by the desiccant from the ambient air 8. In this way, it is possible to obtain a concentration of moisture from an otherwise "dry" atmosphere. Triethylene glycol is the preferred desiccant while other desiccants, such as, lithium chloride may also be used. Mixture 6 is delivered to the top of solar screen 10 by pump 12 via pipeline 14 whereby mixture 6 is allowed to flow by gravity means down hot, inclined face 16 of solar screen 10. It should be noted that face 16, which may be black to maximize heat absorption, is heated by solar radiation 18 which travels through top panel 19 and conduit 20. It should also be noted that in the preferred embodiment conduit 20 is partially closed to the ambient air and is formed by top panel 19, sides (not shown), bottom end 21, top end 25 and face 16 of solar screen 10. Bottom end 21 contains inlet 22 and top end contains outlet 26. In addition, panel 10 may be adjusted (not shown) as by varying the angle of panel 10 relative to the sun, to maximize heat absorption from solar radiation 18. It is preferred to adjust panel 10 so that face 16 is normal to the sun's rays. Other angles may also be employed by those skilled in the art. Panel 10 may also be adjusted to effect gravity flow of mixture 6 down face 16. The rate of flow may be varied to obtain the maximum production rate of moisture. It should be noted that the means for adjusting panel 10 are not shown in the drawings. As mixture 6 flows down face 16, mixture 6 absorbs heat and the moisture contained therein is caused to vaporize and mix with ambient air 8, to then form moisture rich mixture 24. It should be noted that ambient air 8 enters conduit 20 at inlet 22 wherein mixture 24 (air and water vapor), increases in dew point as it moves through conduit 20. Mixture 24 then exits conduit 20 at outlet 26 and is cooled by cooling pipe 28 and condenser 30. The water vapor in mixture 24 condenses to form potable condensate 32 which is collected in container 34. Desiccant 36 is recovered at outlet 38 for reuse in desiccant pond 4. It should be noted that the device in FIG. 1, may be operated with only one active device (i.e. pump 12).

FIG. 2 illustrates an alternate embodiment of the present invention and is completely passive. As shown in FIG. 2, desiccant pond 60 includes high moisture content side 62, low moisture content side 64, weir 66, cover 68 with end baffle 69 and chamber 70. It should be noted that chamber 70 includes front and back sides, not shown. In operation, moisture is absorbed by desiccant pond 60 from ambient air 72 on side 62. The moisture rich mixture is then heated by solar radiation 74 to release and form moisture rich vapor 76 in chamber 70. Moisture rich vapor 76 then exits chamber 70 at outlet 75 and may then be cooled (not shown) to form a potable condensate (not shown). It should be noted that water flows over and under weir 66 as indicated by arrows 78 and 80 respectively. This flow is a result of the difference in densities between a desiccant with a high moisture content and a desiccant with a low moisture content. Weir 66 may be adjusted to maximize water production for specific ambient conditions and types of liquid desiccant.

Figure 3:
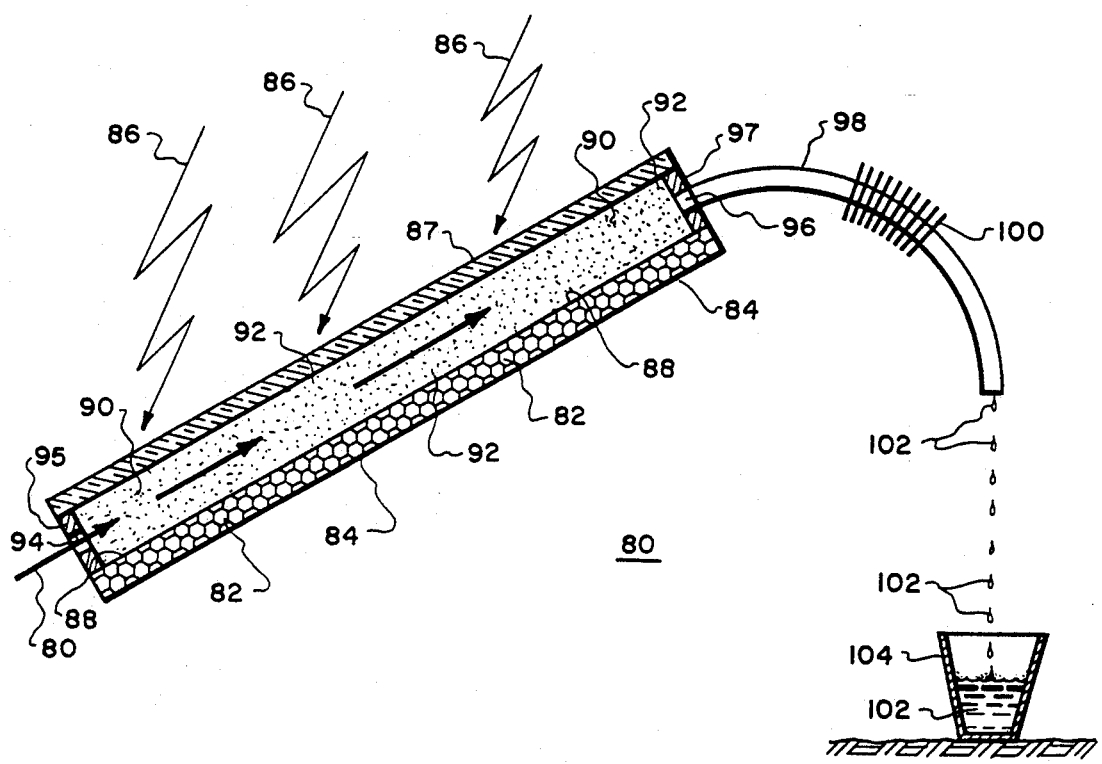
FIG. 3 is a cross-sectional view of passive embodiment of the present invention using a solid desiccant for collecting moisture.

FIG. 3 illustrates an embodiment of the present invention using a solid desiccant. As shown in FIG. 3, the moisture from ambient air 80 is absorbed by cool back side 84 of solid desiccant bed 82. As solar radiation 86 travels through transparent panel 87 and heats side 88 of bed 82, the moisture absorbed in bed 82 is caused to vaporize and mix with ambient air 80, to then form moisture rich mixture 90. It should be noted that ambient air 80 enters chamber 92 at inlet 94 of side 95, wherein moisture rich mixture 90 (air and water vapor) increases in dew point as it moves through chamber 92. Mixture 90 then exits chamber 92 at outlet 96 of side 97 and is cooled by cooling pipe 98 and condenser 100. The water vapor in mixture 90 condenses to form potable condensate 102 which is collected in container 104.

It should be noted that the sides of chamber 92 are not shown.

Obviously many modifications and variations of the present invention are possible in the light of the above teachings. It is therefore to be understood that within the scope of the appended claims, the invention may be practiced otherwise than as specifically described.

What is claimed is:

1. An apparatus for extracting moisture from the ambient air comprising:
   (a) a desiccant pond for absorbing moisture from the air to obtain a moisture rich desiccant;
   (b) a weir for partially separating the desiccant pond, said pond having a low moisture content on one side of said weir and a high moisture content on the other side of said weir when in operation;
   (c) means for heating the high moisture content side of said desiccant pond to obtain a moisture rich vapor;
   (d) a chamber associated with the high moisture content side of said desiccant pond for segregating the moisture rich vapor from the ambient air;
   (e) means for cooling said moisture rich vapor from the chamber to produce a potable condensate.

2. The apparatus defined in claim 1, wherein the top side of the chamber is transparent for allowing the sun's rays to penetrate the transparent side and heat the high moisture content side.

* * * * *